United States Patent Office 3,271,358
Patented Sept. 6, 1966

3,271,358
POLYOLEFINS CONTAINING DI(SUBSTITUTED PHENYL) OXALATES OR CARBONATES AS STABILIZERS
Aubert Yaucher Coran, Charleston, W. Va., and Constantine Emmanuel Anagnostopoulos, St. Louis, Mo., assignors to Monsanto Company, a corporation of Delaware
No Drawing. Filed June 19, 1963, Ser. No. 288,926
13 Claims. (Cl. 260—45.85)

The present invention relates to new and improved olefin polymer compositions. More particularly, this invention relates to compositions comprising an olefin polymer in combination with an adjuvant which has the property of stabilizing the properties of the polymer against the degradative effects of ultraviolet light.

In accordance with this invention, it has been found that the properties of an olefin polymer are improved by incorporating therein a stabilizing amount of a compound of the formula,

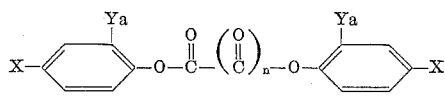

wherein:

$a$ is an integer from 0 to 1;
$n$ is an integer from 0 to 1;
Y is alkyl of from 1 to 4 carbon atoms; and
X is selected from the group consisting of alkyl of from 4 to 18 carbon atoms and α-cumyl.

The alkyl substituents represented by Y can be either straight or branched alkyl chains; e.g., methyl, ethyl, n-propyl, isopropyl, n-butyl, isobutyl, sec.-butyl and t-butyl. The alkyl substituents represented by X can also be straight or branched chains; e.g., n-butyl, t-butyl, n-amyl, isoamyl, 2-methylbutyl, 1,1-dimethylpentyl, n-octyl, 2-ethylhexyl, 1,1,3,3-tetramethylbutyl, n-nonyl, isodecyl, undecyl, dodecyl, tridecyl, pentadecyl, hexadecyl and octadecyl.

Illustrative examples of specific carbonic and oxalic esters contemplated by the foregoing formula are:

di(4-t-butylphenyl) oxalate,
di(4-isodecylphenyl) oxalate,
di(4-t-butylphenyl) carbonate,
di(4-octadecylphenyl) carbonate,
di(4-isoamylphenyl) carbonate,
di(4-α-cumylphenyl) oxalate,
di(4-isooctylphenyl) oxalate,
bis[4-(1,1-dimethylbutyl)phenyl] carbonate,
bis[4-(1,1,3,3-tetramethylbutyl)phenyl] oxalate,
di(4-hexadecylphenyl) oxalate,
di(4-nonylphenyl) carbonate,
di(4-n-butylphenyl) carbonate,
di(4-t-butyl-2-methylphenyl) oxalate,
di(4-nonyl-2-n-propylphenyl) oxalate,
bis[4-(1,1-dimethylpentyl)-2-methylphenyl] carbonate,
di(4-α-cumyl-2-ethylphenyl) carbonate.

The oxalates of this invention can be prepared by reacting a halide of oxalic acid with an appropriate substituted phenol, such as para-alkylphenol or an ortho,para-alkylphenol. Exemplary preparations are fully described in copending application Serial No. 288,889, filed June 19, 1963. The carbonates of this invention are prepared in a similar manner employing phosgene in place of the oxalyl halide.

The olefin polymers used in the compositions of this invention can be any normally solid short-chain mono-olefinic aliphatic hydrocarbon polymer, e.g., polymers of ethylene, propylene, isobutylene, etc., regardless of the process by which it is produced. For example, not only the commercial polyethylene currently produced by high-pressure processes, which is a low-density polymer, can be used, but also high-density ethylene polymers obtained from the newer low-pressure processes, such as the proprietary materials, "Marlex," "Marlex 50," etc., produced by the so-called Phillips process (Phillips Petroleum Company), the so-called Ziegler polymers produced by the Ziegler process, and other low-pressure processes wherein the so-called Ziegler-type catalysts are used.

The short-chain mono-olefinic aliphatic hydrocarbon polymers used in the compositions of this invention may be copolymers of two or more of the aforementioned short-chain mono-olefinic aliphatic hydrocarbon monomers, especially copolymers of ethylene with minor amounts (from 2 to 10 percent) of higher olefins such as propylene or butylene, and copolymers of one or more short-chain mono-olefinic aliphatic hydrocarbon monomers with minor proportions, not to exceed 15% by weight of the olefin, of other ethylenically-unsaturated comonomers such as styrene, vinyl chloride, vinyl acetate, vinyl methyl ether, vinylidene chlorofluoride, methyl methacrylate.

The olefin polymers to which the present invention is applicable must have molecular weights sufficiently high to be normally solid at room temperatures, i.e., above about 5,000; preferably, the olefin polymers will have even higher molecular weights, e.g., 20,000 and above. The molecular weights in question are those calculated in the conventional manner on the basis of the viscosity of the polymer in solution, as described in J.A.C.S. 73, page 1901 (1951).

Particularly from the standpoint of optimum stabilizing effectiveness, and also considering the availability of starting materials and commercial practicality, an especially preferred group of esters is characterized by the formula,

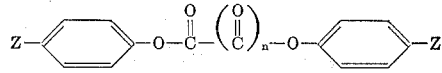

wherein:

$n$ is an integer from 0 to 1; and
Z is selected from the group consisting of α-cumyl and

where R, $R_1$ and $R_2$ are each alkyl of 1 to 15 carbon atoms, and the sum of $R+R_1+R_2$ is up to 17 carbon atoms.

Typical examples of this preferred group of oxalic and carbonic acid esters are:

di(4-t-butylphenyl) oxalate,
bis[4-(1,1,3,3-tetramethylbutyl)phenyl] carbonate,
di(4-α-cumylphenyl) carbonate,
bis[4-(1-ethyl-1-methylpentyl)phenyl] oxolate,
di(4-t-butylphenyl) carbonate, and those esters of oxalic and carbonic acids wherein the 4-alkylphenol starting material comes from the reaction product of a phenol and a branched chain propylene or butylene polymer. As should be apparent, the alkylphenols prepared from such polymers will be predominantly those wherein the alkyl group is attached to the nucleus through a tertiary carbon atom.

In evaluating the light stabilizing efficiency of the oxalic and carbonic acid esters of this invention, use is made of the following empirical testing methods:

(1) *Carbonyl content.*—The carbonyl content of the composition is determined after exposure by measurement of the infrared absorption in the 5.82 millimicron region and is expressed as mols $\times 10^4$ per liter. Reference is made to the following two publications concerning the determination of carbonyl content by infrared measurements: Rugg, Smith and Bacon, J. Polymer Sci. 13, 535 (1954); Cross, Richards and Willis, Discussions Faraday Soc., No. 9, 235 (1950).

(2) *Vinyl group formation.*—Infrared spectographic measurements are made before and after exposure using the baseline technique in the region of 11.0 microns and the extinction coefficients of J. A. Anderson and W. D. Sugfried, Anal. Chem. 20, 998 (1948). The amount of vinyl (C=C) formed during exposure is expressed in mols $\times 10^4$ per liter.

(3) *180° C. bend test.*—Specimens were folded and the amount of cracking, crazing, etc., was recorded.

The following procedures, in which all parts and percentages are by weight unless otherwise specified, more fully illustrate the nature of the invention.

PROCEDURE 1

Test compositions are prepared by incorporating the additive into polyethylene (molecular weight 20,000) on a heated roll mill. Thereafter the polyethylene is compression molded into sheets about 6 mils thick. Film samples containing the various additives noted below, and control films containing no additives, are exposed to ultraviolet radiation, a major portion of which is due to the 3130 and 3657 A. mercury lines (G.E. H3FE lamp). The films are exposed at a distance of 5 inches from a light source having a total ultraviolet emission of about 10 watts for various periods of time. The results obtained for several oxalic and carbonic acid esters of this invention are set forth in Table A, below. The additives employed are:

(A) di(4-t-butylphenyl) carbonate,
(B) bis[4-(1,1,3,3-tetramethylbutyl)phenyl] oxalate,
(C) di(4-t-butylphenyl) oxalate,
(D) di(4-t-butyl-2-methylphenyl) oxalate,
(E) di(4-nonylphenyl) carbonate,
(F) di(4-n-butylphenyl) oxalate,
(G) di(4-α-cumylphenyl) oxalate,
(H) di(4-nonylphenyl) oxalate.

*Table A*

| Composition | Additive | Hours | Conc. Percent | Carbonyl | Vinyl | 180° Bend |
|---|---|---|---|---|---|---|
| 1-1 | None | 90 | | 98 | 94 | |
| 1-2 | A | 90 | 1 | 82 | 0 | |
| 1-3 | F | 90 | 1 | | 0 | |
| 1-4 | C | 90 | 1 | 36 | 0 | |
| 1-5 | D | 90 | 1 | 89 | 0 | |
| 1-6 | B | 90 | 1 | 18 | 0 | |
| 1-7 | H | 90 | 1 | 46 | 0 | |
| 1-8 | G | 90 | 1 | 89 | 12 | |
| 1-9 | None | 100 | | | 107 | |
| 1-10 | E | 100 | 1 | | 65 | |
| 1-11 | None | 200 | | | 290 | |
| 1-12 | E | 200 | 1 | | 168 | |
| 1-13 | None | 210 | | 287 | 240 | Poor. |
| 1-14 | A | 210 | 1 | 152 | 20 | Good. |
| 1-15 | F | 210 | 1 | | 50 | Fair. |
| 1-16 | C | 210 | 1 | 195 | 0 | Good. |
| 1-17 | D | 210 | 1 | | 0 | Good. |
| 1-18 | B | 210 | 1 | 160 | 27 | Good. |
| 1-19 | H | 210 | 1 | 265 | 30 | Good. |
| 1-20 | G | 210 | 1 | | 110 | Fair. |
| 1-21 | None | 306 | | 485 | 560 | |
| 1-22 | B | 306 | 1 | 198 | 96 | |
| 1-23 | None | 472 | | 1,178 | 1,025 | |
| 1-24 | B | 472 | 1 | 495 | 192 | |

Results similar to those obtained with Additives G and F are realized upon substituting the following compounds, in substantially the same amount, for such additives:

di(4-hexadecylphenyl) oxalate,
di(4-n-butyl) carbonate,
di(2-ethyl-4-n-hexylphenyl) carbonate,
di(4-isoamylphenyl) oxalate,
di(4-α-cumyl-2-n-propylphenyl) oxalate,
bis[4-(2-ethylhexyl)phenyl] carbonate.

Results similar to those obtained with Additives A and B are realized upon substituting the following compounds, in substantially the same amount, for such additives:

bis[4-(1,1,3,3-tetramethylbutyl)phenyl] carbonates,
bis[4-(1-ethyl-1-methylpentyl)phenyl] oxalate,
di(4-t-dodecylphenyl) oxalate,
bis[4-(1,1-dimethylbutyl)phenyl] carbonate.

PROCEDURE 2

Polyethylene (average molecular weight ca. 20,000) films of varying thicknesses, containing amounts of Additives A and B of Procedure 1, such amounts varying from 0.2% to 3.0% are prepared by dry blending each of the compounds in the amount desired, extruding the blends twice, and then blowing them into films. A control film, containing no ester, is prepared in the same manner. The films are exposed to direct sunlight in the State of Florida by mounting the films (unbacked at an angle of 45° from the horizontal) on racks facing the south. Samples of each film are removed periodically and tested for carbonyl content and vinyl group formation. The results obtained with films of 2-mil and 5-mil thicknesses, over periods of from about 1 to 5 months, demonstrate that the films containing the additives are significantly more resistant to degradation.

PROCEDURE 3

Ten grams of powdered polypropylene (viscosity molecular weight 220,000) are mixed with 0.4% of bis-lauryl thiodipropionate, 0.3% of 4,4'-butylidenebis-(6-tert,-butyl-m-cresol), and an ester of this invention. The specific esters are Additives A and B of Procedure 1. The mixture is worked on a roll mill at 165–170° C. for 2–3 minutes. Films are formed from pieces of the milled sheets (0.8" x 1.2" x 0.012") by heat and pressure (11.3 kg.) between two polished glass plates (treated with dimethyldichlorosilane vapor and washed clean with chloroform and acetone) using copper wire spacers of suitable thicknesses. The "sandwiches" are heated under pressure on a hot plate (220–230° C.) for about 5 minutes and 10 minutes for 8-mil and 4-mil films, respectively. After air-cooling to about room temperature, the films are removed from the plates. Control films, containing no ester, are prepared in the same manner.

The films are exposed to direct sunlight in the State of Florida by mounting the films (unbacked at an angle of 45° from the horizontal) on racks facing the south. Samples of each film are removed periodically and tested for carbonyl conent. The results obtained further demonstrate that the oxalic and carbonic acid esters of this invention serve to stabilize the films against the degradative effects of ultraviolet light.

As is obvious from the above procedures, the oxalic and carbonic acid esters contemplated herein are valuable stabilizers for polyolefinic materials. The manner in which they are incorporated into or applied to the polymer materials will depend upon the individual nature of the polymer and upon its physical form; but it is generally that which is customarily employed when the same polymers in the same physical form are contacted with prior art adjuvants.

Variations or modifications of the compounds, and the quantities thereof employed in the above procedures, can be made to accommodate different requirements so long as the compound belongs to the general class of oxalic and carbonic acid esters hereinbefore defined. The same process, as illustrated in the above procedures, will be found to be satisfactory for producing additional illustrations, e.g., by employing, in the place of the specific acid esters used in the procedures, other specific esters within the broad scope of the structural formula given at the outset of this disclosure; or by employing olefin polymers different from those used in the procedures.

The choice and the amount of the particular acid ester used to stabilize a polymer can vary considerably depending upon many factors. Such factors include the nature of the particular polymer, the thickness of the film or other article, and the conditions of service to be encountered. Thus, in the stabilization of a polyolefin to be used in the manufacture of goods which are normally subjected to the action of sunlight, as well as exposure to the elements, the use of relatively high concentrations of the stabilizers of this invention is advantageous. The same is true of films which are used in outdoor applications. On the other hand, when the article of manufacture is not to be subjected to particularly severe conditions, such as in the case of goods which are to be used indoors, relatively low concentrations can be successfully employed. Accordingly, the amount used is a stabilizing amount determinable by a consideration of these many factors. In general, concentrations of the oxalic and carbonic acid esters of from about 0.001% to about 10% by weight of the polymer can be used. Preferably, from about 0.1% to 3% by weight of said esters, based on the weight of the polymer, is used in the compositions of this invention.

Most polymeric compositions comprise many ingredients, such as dyes, antistatic agents, fillers, pigments and heat stabilizers, and the compounds of this invention can be employed in conjunction with such other ingredients without any adverse effects. Likewise, the acid esters of this invention may be used in conjunction with other known light stabilizers. The ingredients can be intermixed by milling, blending, extruding or any of the other conventional methods which are well known to those skilled in the art.

The modified polymeric materials of this invention may be molded, extruded or sprayed. Typical applications for such materials include molded or extruded objects, continuous sheetings, tubing, fibers, films, wire coatings, textile coatings, laminates and adhesives.

Increased amounts of the oxalic and carbonic acid esters (i.e., over and above the amount which is per se compatible with the polymer) can be incorporated into the solid polymeric alkenes, such as polyethylene, polypropylene and polyisobutylene, by using up to 10% by weight of the polymer of finely divided silica. In general, the amount of silica used is from one to two times the amount of the ester stabilizer which is to be incorporated in the polymer. Preferably the silica and the ester are mixed separately prior to incorporation into the polymer.

While this invention has been described with respect to certain embodiments, it is not so limited, and it is to be understood that variations and modifications thereof may be made without departing from the spirit or scope of this invention.

The embodiments of the invention in which an exclusive property or privilege is claimed are defined as follows:

1. A composition comprising a normally solid polymer of a mono-olefinic aliphatic hydrocarbon monomer having from 2 to 4 carbon atoms, and a stabilizing amount, at least about 0.001% by weight of the polymer, of a compound of the formula,

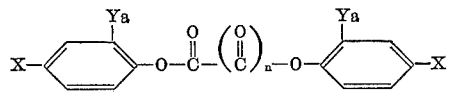

wherein:

$a$ is an integer from 0 to 1;
$n$ is an integer from 0 to 1;
Y is alkyl of from 1 to 4 carbon atoms; and
X is selected from the group consisting of alkyl of from 4 to 18 carbon atoms and α-cumyl.

2. The composition defined in claim 1 further characterized in that the polymer is polyethylene.
3. The composition defined in claim 1 further characterized in that the polymer is polypropylene.
4. The composition defined in claim 1 further characterized in that said stabilizing amount of said compound is from about 0.1% to about 3.0% by weight of the polymer.
5. A composition comprising a normally solid polymer of a mono-olefinic aliphatic hydrocarbon monomer having from 2 to 4 carbon atoms, and a stabilizing amount, at least about 0.001% by weight of the polymer, of a compound of the formula,

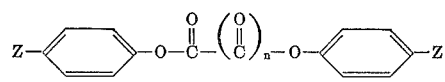

wherein:
Z is selected from the group consisting of α-cumyl and

where, R, $R_1$ and $R_2$ are alkyl of 1 to 15 carbon atoms, and the sum of $R+R_1+R_2$ is up to 17 carbon atoms; and
$n$ is an integer from 0 to 1.

6. The composition defined in claim 5 characterized in that the polymer is polypropylene.
7. A composition as defined in claim 6 further characterized in that the compound is di(4-t-butylphenyl) oxalate.
8. A composition as defined in claim 6 further characterized in that the compound is bis[4-(1,1,3,3-tetramethylbutyl)phenyl] oxalate.
9. A composition as defined in claim 6 further characterized in that the compound is di(4-t-butylphenyl) carbonate.
10. The composition defined in claim 5 further characterized in that the polymer is polyethylene.
11. A composition as defined in claim 10 further characterized in that the compound is di(4-t-butylphenyl) oxalate.
12. A composition as defined in claim 10 further characterized in that the compound is bis[4-(1,1,3,3-tetramethylbutyl)phenyl] oxalate.
13. A composition as defined in claim 10 further characterized in that the compound is di(4-t-butylphenyl) carbonate.

References Cited by the Examiner
UNITED STATES PATENTS

| | | | |
|---|---|---|---|
| 2,345,006 | 3/1944 | Ross et al. | 260—479 |
| 2,859,194 | 11/1958 | Reed et al. | 260—45.85 |
| 2,926,152 | 2/1960 | Gordon | 260—45.85 |
| 3,211,562 | 10/1965 | Biland | 260—45.9 |

LEON J. BERCOVITZ, *Primary Examiner.*

G. W. RAUCHFUSS, *Assistant Examiner.*